(12) United States Patent
Ying et al.

(10) Patent No.: US 11,005,767 B2
(45) Date of Patent: May 11, 2021

(54) METHOD, DEVICE AND COMPUTER PROGRAM PRODUCT FOR DATA PROCESSING

(71) Applicant: EMC IP Holding Company LLC, Hopkinton, MA (US)

(72) Inventors: Zhi Ying, Shanghai (CN); Pengfei Wu, Shanghai (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 27 days.

(21) Appl. No.: 16/422,598

(22) Filed: May 24, 2019

(65) Prior Publication Data

US 2020/0136980 A1 Apr. 30, 2020

(30) Foreign Application Priority Data

Oct. 26, 2018 (CN) .......................... 201811261885.5

(51) Int. Cl.
*H04L 12/28* (2006.01)
*H04L 12/851* (2013.01)
*H04L 12/24* (2006.01)
*H04L 29/08* (2006.01)
*H04L 12/865* (2013.01)
*H04L 29/06* (2006.01)

(52) U.S. Cl.
CPC ...... *H04L 47/2433* (2013.01); *H04L 41/0866* (2013.01); *H04L 41/5022* (2013.01); *H04L 47/2408* (2013.01); *H04L 47/6275* (2013.01); *H04L 67/28* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 9,396,500 B2* | 7/2016 | Barkett | H04L 67/1002 |
| 10,182,128 B1* | 1/2019 | Allocca | H04L 67/2833 |
| 2002/0012585 A1* | 1/2002 | Kalkunte | H04L 45/00 415/137 |
| 2004/0117468 A1* | 6/2004 | Wang | H04L 47/10 709/223 |
| 2005/0141509 A1* | 6/2005 | Rabie | H04L 12/5602 370/395.1 |
| 2008/0020775 A1* | 1/2008 | Willars | H04L 47/2441 455/445 |
| 2010/0067489 A1* | 3/2010 | Pelletier | H04L 69/22 370/331 |
| 2011/0047256 A1* | 2/2011 | Babu | H04L 29/12367 709/223 |
| 2019/0087214 A1* | 3/2019 | To | H04L 12/462 |

* cited by examiner

Primary Examiner — Clemence S Han
(74) Attorney, Agent, or Firm — Ryan, Mason & Lewis, LLP

(57) ABSTRACT

A data processing method comprises: receiving a data packet related to a service. The method also comprises determining whether predefined configuration information indicates a priority of the service. The method further comprises in response to the configuration information indicating the priority of the service, adding an indication of the priority into the data packet. The above method can enable the underlying network devices to adopt a suitable strategy to process data packets from services of different priorities, so as to improve the transmission efficiency of the data packets and enhance user experience of the services.

20 Claims, 6 Drawing Sheets

METHOD, DEVICE AND COMPUTER PROGRAM PRODUCT FOR DATA PROCESSING

RELATED APPLICATION(S)

The present application claims priority to Chinese Patent Application No. 201811261885.5, filed Oct. 26, 2018, and entitled "Method, Device and Computer Program Product for Data Processing," which is incorporated by reference herein in its entirety.

FIELD

Embodiments of the present disclosure generally relate to the data management field, and more specifically, to method, device and computer program product for data processing.

BACKGROUND

Along with rapid development of computer technologies, computers are used to implement all kinds of tasks in every field. In order to implement these tasks, developers design a lot of programs with different functions. In the design of these programs, many services are used to perform different functions of the programs. As the running services are increasing, management of inter-service communications becomes very important. Therefore, many different inter-service communication modes have been proposed and widely applied in practice.

To control communications from service to service, new technologies are proposed. Service Mesh is a newly proposed technology for controlling inter-service communications and has been applied into actual program development by many developers. Service Mesh is a configurable infrastructure layer for service applications and is mainly used for controlling communications from service to service. The use of Service Mesh makes the inter-service communications faster, more flexible and more reliable. Service Mesh also offers functions such as service discovery, load balancing, encryption, authentication and authorization. The inter-service communications are growing due to the increase of services and there are a lot of problems to be addressed in the inter-service communications.

SUMMARY

Embodiments of the present disclosure provide method, device and computer program product for data processing.

In accordance with a first aspect of the present disclosure, there is provided a method for data processing. The method comprises: receiving a data packet related to a service. The method also comprises determining whether predefined configuration information indicates a priority of the service. The method further comprises in response to the configuration information indicating the priority of the service, adding an indication of the priority into the data packet.

In accordance with a second aspect of the present disclosure, there is provided an electronic device for data processing. The electronic device comprises: a processor; and a memory comprising computer program instructions stored thereon, the processor executing the computer program instructions in the memory to control the electronic device to perform acts comprising: receiving a data packet related to a service; determining whether predefined configuration information indicates a priority of the service; in response to the configuration information indicating the priority of the service, adding an indication of the priority into the data packet.

In accordance with a third aspect of the present disclosure, there is provided a computer program product. The computer program product is tangibly stored in a non-volatile computer-readable medium and comprises machine-executable instructions which, when executed, cause a machine to perform steps of the method in accordance of the first aspect of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding reference signs indicate same or corresponding parts.

DETAILED DESCRIPTION

Figure 1:
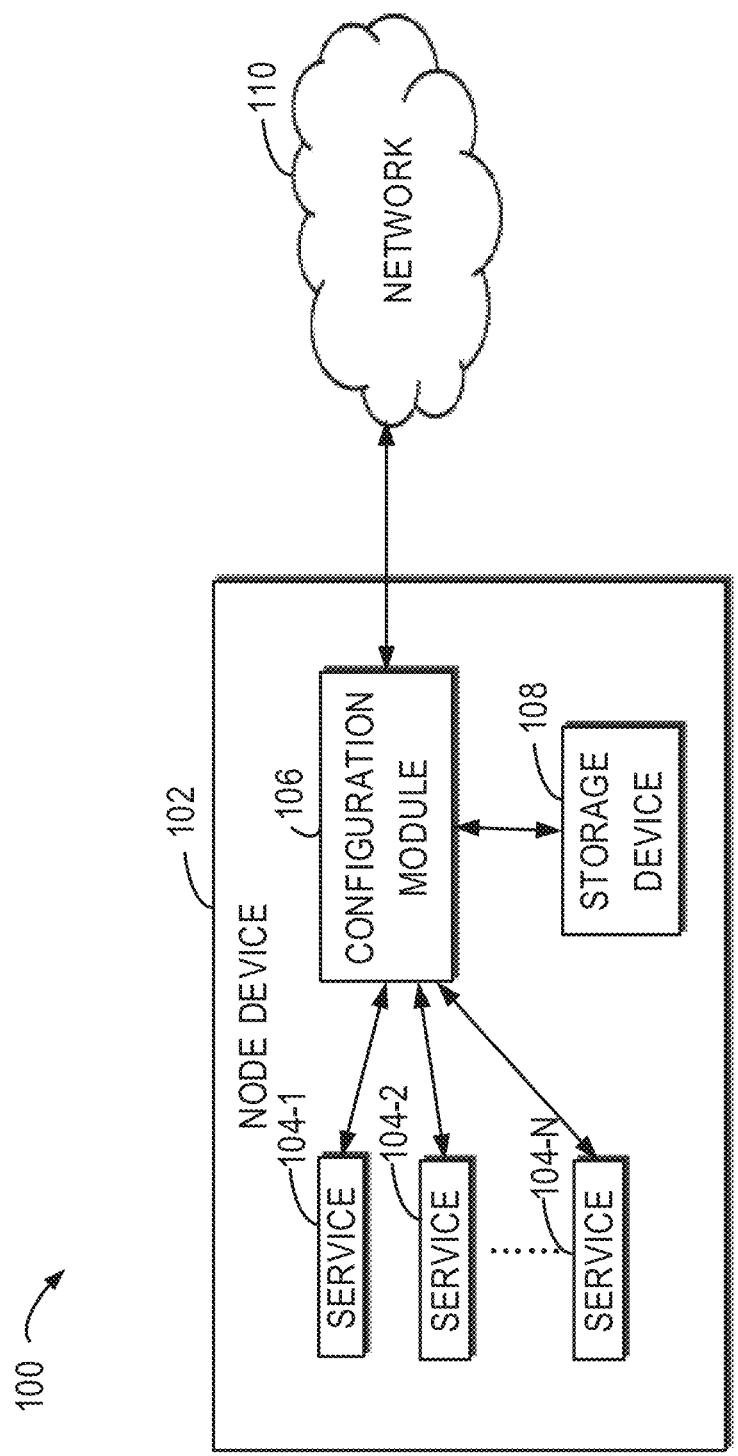
FIG. 1 graphically illustrates a schematic diagram of an example environment where the device and/or the method according to the embodiments of the present disclosure can be implemented.

The embodiments of the present disclosure will be described in more details with reference to the drawings. Although the drawings illustrate some embodiments of the present disclosure, it should be appreciated that the present disclosure can be implemented in various manners and should not be limited to the embodiments described herein. On the contrary, the embodiments are provided to understand the present disclosure in a more thorough and complete way. It should be appreciated that drawings and embodiments of the present disclosure are only for exemplary purposes rather than restricting the protection scope of the present disclosure.

In the descriptions of the embodiments of the present disclosure, the term "includes" and its variants are to be considered as open-ended terms that mean "includes, but is not limited to." The term "based on" is to be understood as "based at least in part on." The terms "one embodiment" and "this embodiment" are to be read as "at least one embodiment." The terms "first", "second" and so on can refer to same or different objects. The following text also can comprise other explicit and implicit definitions.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

In case of communications between services, general services are provided for transmitting data only and are not concerned with data transmission status in the network. For example, in the Service Mesh technology, the Service Mesh is usually implemented by providing a proxy for each service instance, the proxy handling inter-service communications, security and other issues. However, the Service Mesh fails to manage underlying network transmissions.

There are different types of service applications. Some of them are of high priority such as voice/video service, and some of them are of low priority, e.g., file service. The underlying network in the Service Mesh lacks a transmission control strategy for traffic from different services since the Service Mesh does not manage network transmissions. In this case, the performance of high-priority services is bad during network congestion.

There are different physical link types between different nodes within a data center or across data centers. For example, within a data center, 1 Gbps copper links, 10 Gbps fiber links and 100 Gbps RDMA (Remote Direct Memory Access) links can be utilized between different nodes. The connections between data centers are usually much slower than connections within the data center, which obviously causes different connection performance. Usually, the Service Mesh assumes that the connections from service to service are identical and send the same amount of traffic, resulting into degradation of the entire performance.

To solve the above problem, the present disclosure proposes a method for processing data. In this method, priority for data packets from different services is configured using configuration information. For example, an identification of service priority is inserted at a predetermined position in the data packet to identify data packets of different services with different levels, such that the underlying network device controls transmission of data packets during packet transmission. By adopting such method, the underlying network device can employ different transmission strategies for packets of various services during data transmission. For example, the data packets of high-priority services are transmitted by a high-priority queue or via a short routing path. The above operations can improve transmission speed of data packets of high-priority services and reduce transmission time of data packets of high-priority services, especially can rapidly and timely transmit the data packets of high-priority services during data congestion. Therefore, the transmission efficiency of data packets of high-priority services is enhanced and the performance of high-priority services is improved.

FIG. 1 graphically illustrates a schematic diagram of an example environment 100 where the device and/or the method according to the embodiments of the present disclosure can be implemented.

The environment 100 includes a node device 102. The node device 102, as a computing device for running services, can be a computer, a server or any other devices that can be used for running services. Alternatively or additionally, the node device is a node running services in the Service Mesh, wherein the services running in the node communicate with other services via a proxy.

In FIG. 1, there are one or more services 104-1, 104-2 . . . 104-N (collectively known as service 104) running on the node device 102, where N is a positive integer greater than 1.

The node device 102 also includes a configuration module 106, which determines priorities of data packets from different services in accordance with pre-obtained configuration information. In one example, the configuration information in the configuration module 106 can be obtained from a storage device 108 connected thereto. In another example, the configuration module 106 can acquire the configuration information from other applications by communicating with them. In one example, the priorities of different services in the configuration information are set by users. The above examples are provided for the purpose of explanation only and do not specifically restrict the present disclosure. The configuration information can be obtained in any suitable ways based on the requirements and also can be set in any appropriate manners.

The data packets, after being configured by the configuration module 106, can be transmitted to a network 110 and then to other computing devices via the network. This is just an example and the data packets configured by the configuration module also can be directly sent to other computing devices.

Figure 2:
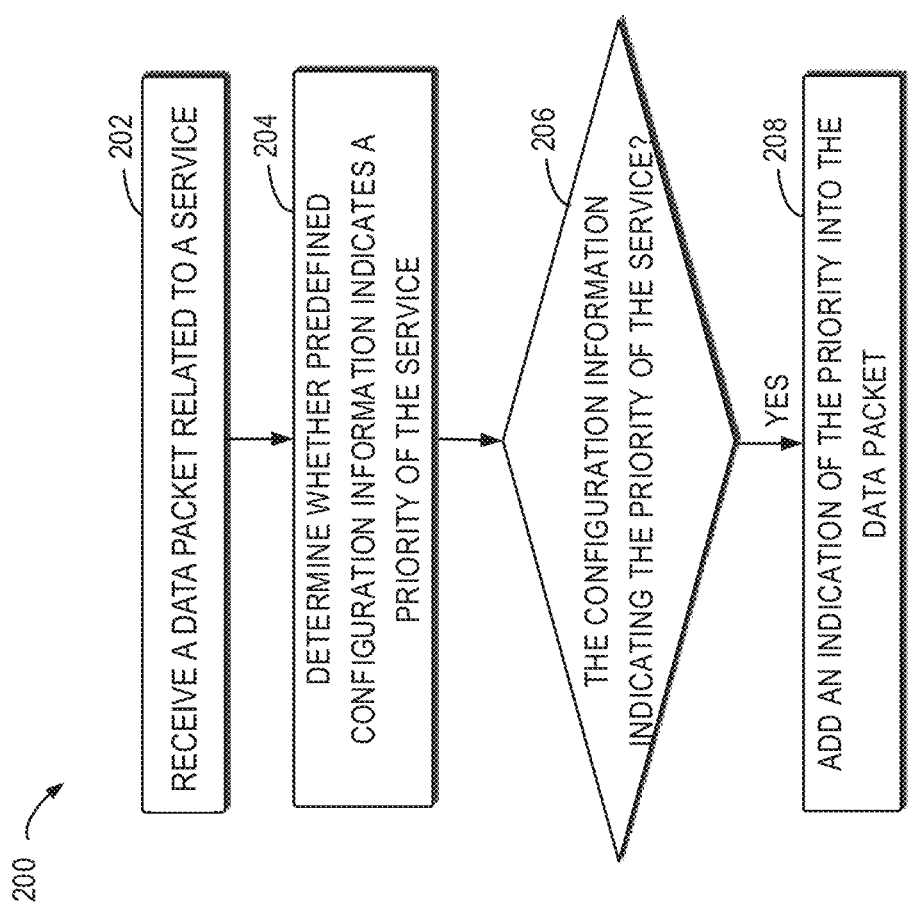
FIG. 2 graphically illustrates a flowchart of a method for adding priority identification in accordance with embodiments of the present disclosure.

The above FIG. 1 has graphically illustrated a schematic diagram of an example environment 100 where the device and/or the method according to the embodiments of the present disclosure can be implemented. A method 200 of processing data in the present disclosure is described in details below with reference to FIG. 2.

A data packet associated with a service is received at block 202. The data packet of the service, when being transmitted to other devices, is sent to the configuration module 106 firstly. Alternatively or additionally, the data packet is a data packet which is transmitted to other devices via the network device.

Alternatively or additionally, upon receipt of the data packet, it is also required to verify validity of the received data packet. In one example, checksum of the received data packet can be verified to determine integrity of the data packet. In a further example, an Internet Protocol (IP) header of the received data packet can be verified to determine validity of the received data packet. Alternatively or additionally, it is verified whether the data packet includes an IP header. The above descriptions are examples for verifying validity only and do not restrict the present disclosure. Any other suitable approaches also can be applied into the present disclosure. If the data packet is invalid, it should be abandoned. If the data packet is valid, the following operations can be performed.

It is determined, at block 204, whether the predefined configuration information indicates service priority. The configuration information at least comprises identification information of the service and indication information of priority of the service. In one example, the configuration information can be set by users. In another example, the configuration information also can be received from other applications or services. The above examples are provided for the purpose of explanation only and do not specifically restrict the present disclosure. The configuration information can be obtained using any other suitable approaches.

After receiving the data packet, it is determined from which service the data packet comes. The data packet includes identification information of the service that generates the data packet. Accordingly, the data in the data packet can be used to determine which service the data packet comes from. If the service generating the data packet exists in the configuration information, an indication of priority corresponding to the service is obtained. If the service from which the data packet comes does not exist in the configuration information, it means that the data packet is directly sent into the network for transmission without identification processing.

It is determined, at block 206, that the configuration information indicates the priority of the service. If the configuration information indicates the priority of the service, the indication of priority is added into the data packet at block 208. When the identification information of the service from which the data packet comes exists in the configuration information, it can be determined that the data packet can be allocated with a corresponding priority. When the priority is found, the indication of the priority is stored in the data packet to identify the data packet.

The data packets from different services can be distinguished in the network transmission by setting the priority in the data packet corresponding to the service. Accordingly, transmission priority or routing path of data packets from different services in the network device can be controlled in the underlying network transmission, such that the data packets of high-priority services are transmitted in priority to reduce waiting time of the data packets or the data packets of high-priority services are transmitted via a short routing path to decrease the transmission distance of the data packets. The above approaches can shorten the transmission time of the data packets with high priority during the transmission procedure and increase transmission efficiency of the data packets of high-priority services, particularly during congestion of data transmission in the network.

There are many ways to add the priority indications to the data. In one example, the priority indication can be directly stored at a predetermined insertion position of the data packet. In one example, the predetermined insertion position is a predetermined field in the header of the data packet. Alternatively or additionally, the data packet includes an IP header and the predetermined field is a file type field in the IP header. In a further example, the insertion position of the priority indication in the data packet can be determined based on the priority.

An example procedure 300 of determining an insertion position of the priority indication based on the priority will be described in details below with reference to FIG. 3. The priority is compared with a threshold priority at block 302. The priority of service from which the data packet comes is determined in the configuration information and compared with the threshold priority, wherein the threshold priority can be set, by users, to any desired values based on the needs.

At block 304, whether the priority is higher than the threshold priority is determined. If the priority is higher than the threshold priority, a first predetermined field of the data packet is determined as the insertion position at block 306, wherein the first predetermined field is a Type-Of-Service field in the IP header of the data packet.

If the priority is lower than or equal to the threshold priority, a second predetermined field in the data packet is determined as the insertion position at block 308, the second predetermined field being different from the first predetermined field. The second predetermined field can be a field in the IP header or other available fields in the data packet.

The insertion position of the priority indication is determined based on priority-based comparison, so as to store identification data of data packets of some services in the file type field of the IP header. Since the IP protocol is quite common and the file type field is a field for identifying types in the IP header, the method can be more conveniently applied in various network devices by writing the priority indication into the field for identifying types in the IP header.

Figure 3:
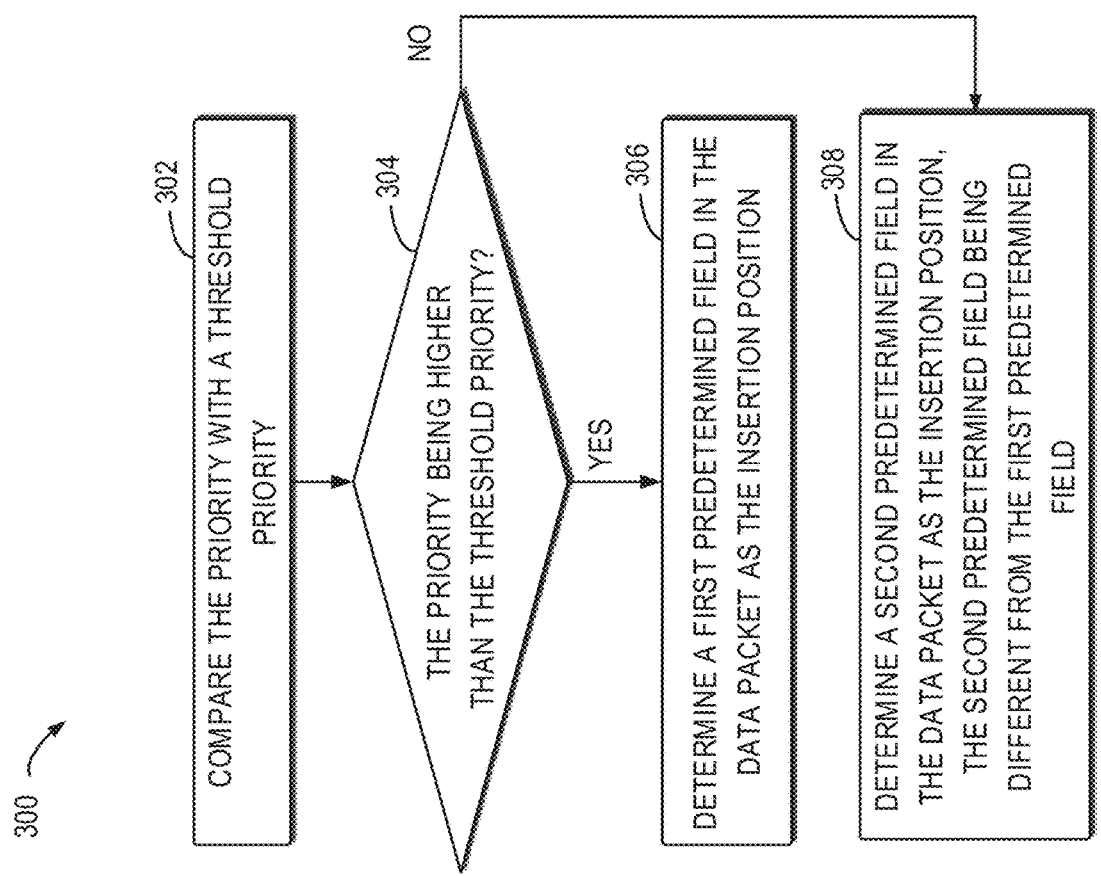
FIG. 3 graphically illustrates a schematic diagram of a method for determining an insertion position in accordance with embodiments of the present disclosure.

FIG. 3 has described the method of determining an insertion position of the priority indication. A schematic diagram of a detailed example 400 of inserting priority identification by the configuration module 106 (FIG. 1) will be described in details below with reference to FIG. 4.

Figure 4:
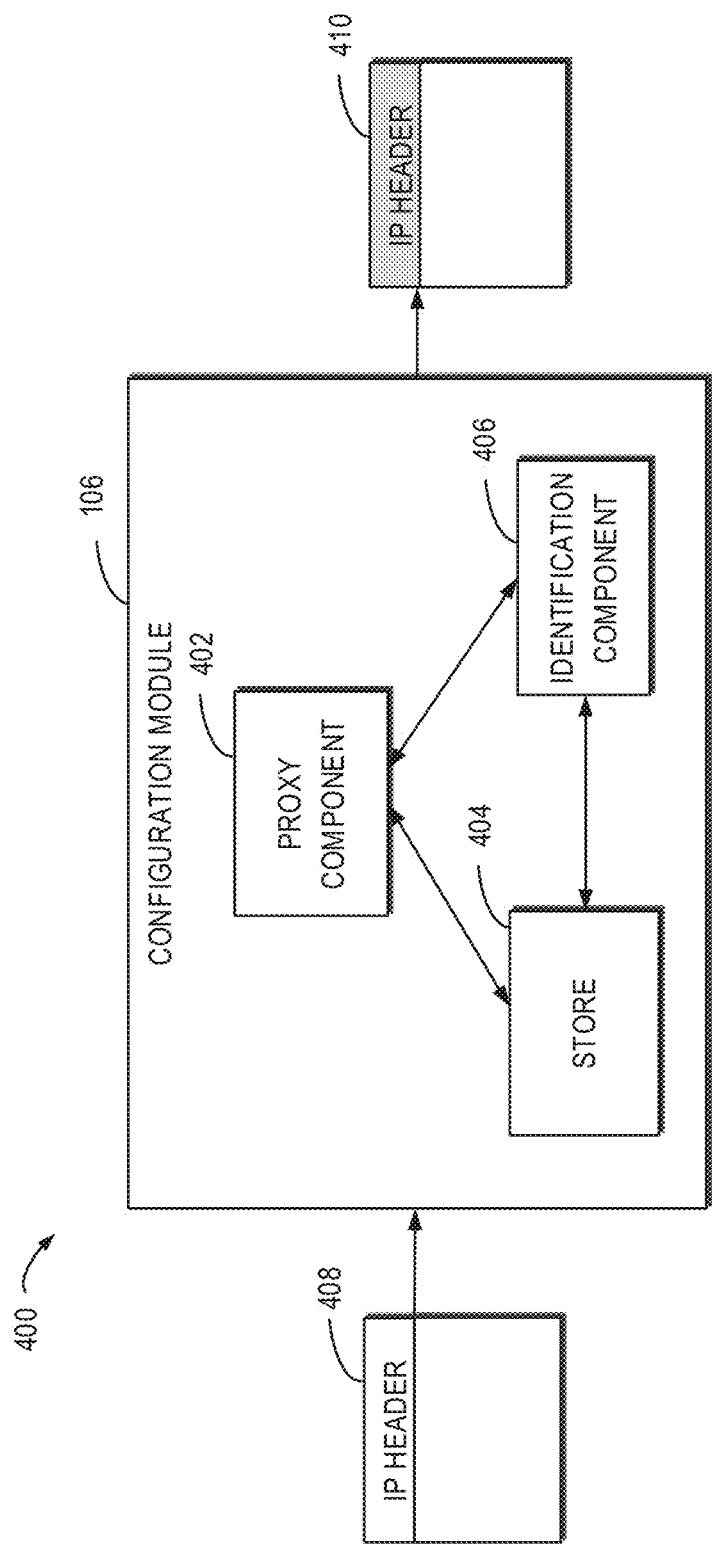
FIG. 4 graphically illustrates a schematic diagram of a detailed example of inserting priority identification in accordance with embodiments of the present disclosure.

In FIG. 4, the configuration module 106 has a proxy component 402 for managing configuration information. The proxy component 402, which is initiated at the startup of the node device 102, acquires the configuration information from the storage apparatuses or applications and stores the configuration information into a store 404. The proxy component 402 is also used to inject an identification component into a system kernel.

The storage library 404 is stored therein with configuration information, which at least includes identification information of the service and indication information of priority of the service. In one example, the priority corresponds to different types of the services. In another example, the priority corresponds to the service. The above examples are provided for the purpose of explanation only and do not restrict the present disclosure. Information corresponding to the priority can be set based on the requirements.

Therefore, data packets from different services can be distinguished by setting a priority on the data packet corresponding to the service.

The identification component 406 is used for storing an indication of the priority information to the predetermined position of the data packet received by the configuration module 106. The identification component 406 performs the above operations based on the configuration information stored in the store 404.

In one example, the identification component can add the priority indication in the predetermined field of the data packet, the predetermined field being any suitable fields available in the data packet. In one example, the data packet 408 contains an IP header and the identification component 406 adds the priority indication in the Type-Of-Service field of the IP header of the data packet 408 to form a data packet 410 with priority identification. In a further example, the identification component 406 adds the priority information in the predetermined field apart from the Type-Of-Service field of the IP header of the data packet. In one example, the identification component 406 determines, based on the priority of the service corresponding to the data packet, the insertion position of the priority indication. The above examples are provided merely for describing the present disclosure and do not restrict the present disclosure. The indication of service priority can be set at any suitable positions of the data packet based on the requirements.

When data is exchanged, via one or more intermediate network devices, between services, the intermediate network device can determine different forwarding manners or forwarding sequences based on the identification of the priority inserted in the data packet. Two examples of using the priority indication are described below in details with reference to example environment 500 in FIG. 5.

Figure 5:
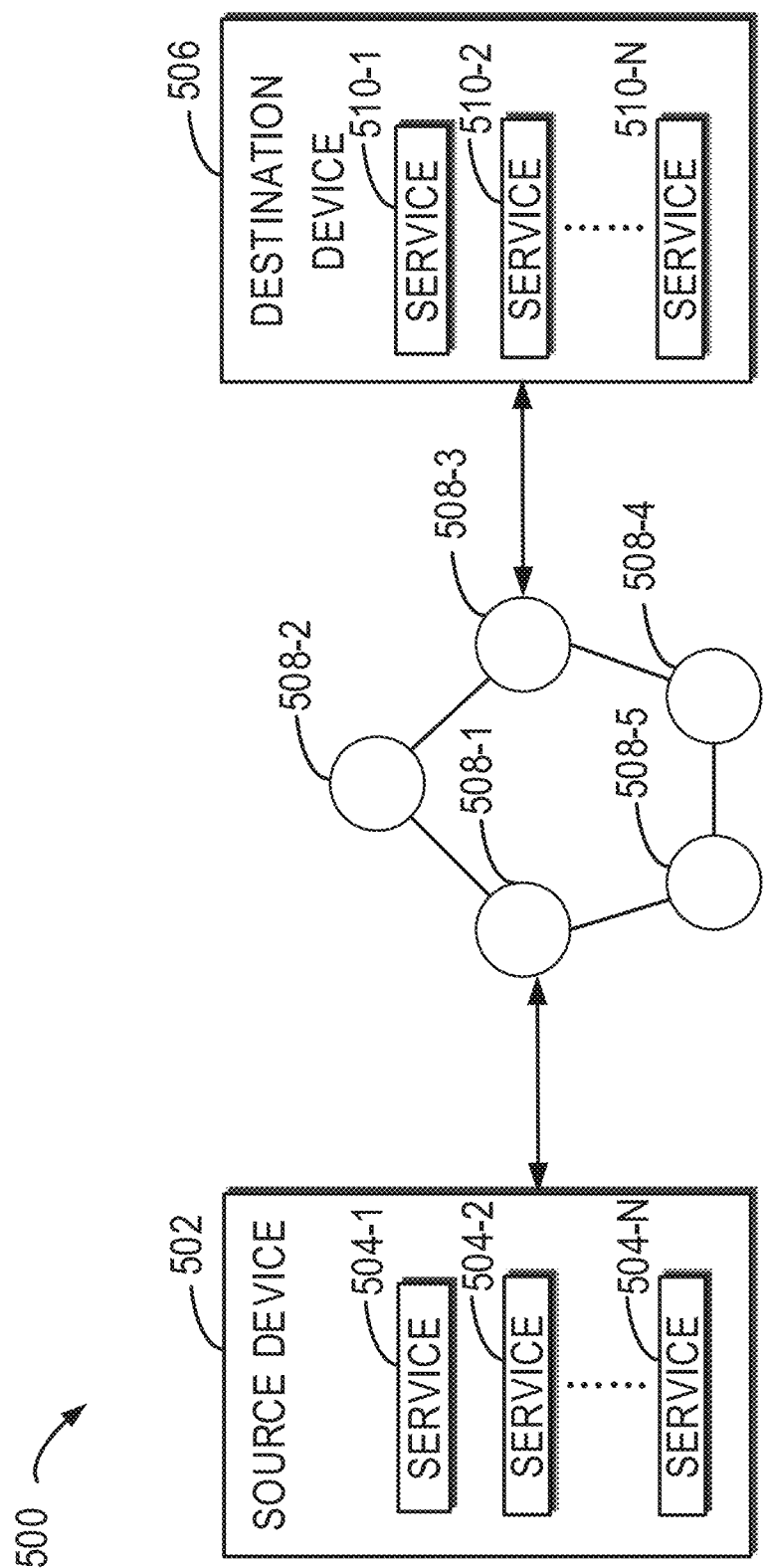
FIG. 5 graphically illustrates a schematic diagram of an example environment for using the priority identification in accordance with embodiments of the present disclosure.

A source device 502 includes one or more services 504-1, 504-2 . . . 504-N (collectively referred to as service 504) in FIG. 5, where N is a positive integer greater than 1. A destination device 504 also includes one or more services 510-1, 510-2 . . . 510-N (collectively referred to as service 510), where N is a positive integer greater than 1. Alternatively or additionally, the number of services in the source device 502 and the destination device 504 can vary. The above examples are provided merely for describing the present disclosure and do not restrict the present disclosure. The source device and the destination device can set any numbers of services based on the requirements.

One or more intermediate network devices can be present between the source device and the destination device. In order to illustrate the present disclosure, five intermediate network devices 508-1, 508-2, 508-3, 508-4 and 508-5 are arranged between the source device and the destination device. The number of the above intermediate network devices is an example only and does not restrict the present disclosure. The number of intermediate network devices between services can be set arbitrarily based on the requirements.

The source device 502 is connected to the intermediate network device 508-1 while the destination device 506 is connected to the intermediate network device 508-3. When the services in the source device 502 transmit data to the services of the destination device 506, the intermediate network devices can know the service from which the data packet comes because the priority is identified in the data packet. Accordingly, a predetermined strategy can be set in the intermediate network device to control data packets of different services.

In one example, different priority queues are set at the intermediate network device 508-1, wherein the different priority queues correspond to different services. Therefore, the intermediate network device can send the data packets of high-priority services in priority and delay the transmission of data packets of services with low time requirement. Likewise, other intermediate network devices also can set the same forwarding strategy.

Data packets from different services are transmit using priority queues, such that the data packets of high-priority services can be sent in priority especially during network congestion. Therefore, the waiting time of the data packets of high-priority services is greatly reduced while the transmission time of the data packets of high-priority services is also significantly shortened, which improves transmission efficiency of the data packets of high-priority services and user experience of high-priority services.

In a further example, different routing strategies are adopted for data packets from services with different priorities at the intermediate network devices 508-1. If the service priority is high, the network transmission time is short and data packet can be transmitted to the destination device via the intermediate network devices 508-1, 508-2 and 508-3. If the service priority is low, the transmission time will be long and the data packet is transmitted to the destination device 506 via the intermediate network devices 508-1, 508-5, 508-4 and 508-3.

Data packets of services with different priorities are sent using various routing strategies, such that the data packets of high-priority services can be transmitted via a short routing path while the data of low-priority services are transmitted via a long routing path. In this case, data packets of high-priority services can be transmitted quickly, and transmission efficiency of data packets of high-priority services over the network path can be improved and different paths in the network can be reasonably utilized, thereby fulfilling balance of task transmission. Moreover, the transmission efficiency of data packets of high-priority services is boosted and the overall transmission capacity of the network is enhanced.

The above examples are provided merely for describing how to control the transmission strategy of the data packets with priority identification rather than restricting the present disclosure. Any other suitable approaches for controlling data transmission strategy with priority identification also can be employed.

Diverse transmission strategies can be adopted for different services by setting transmission strategies related to priority indication in the network, which accordingly improves processing efficiency of different services and promotes experience of service users.

Figure 6:
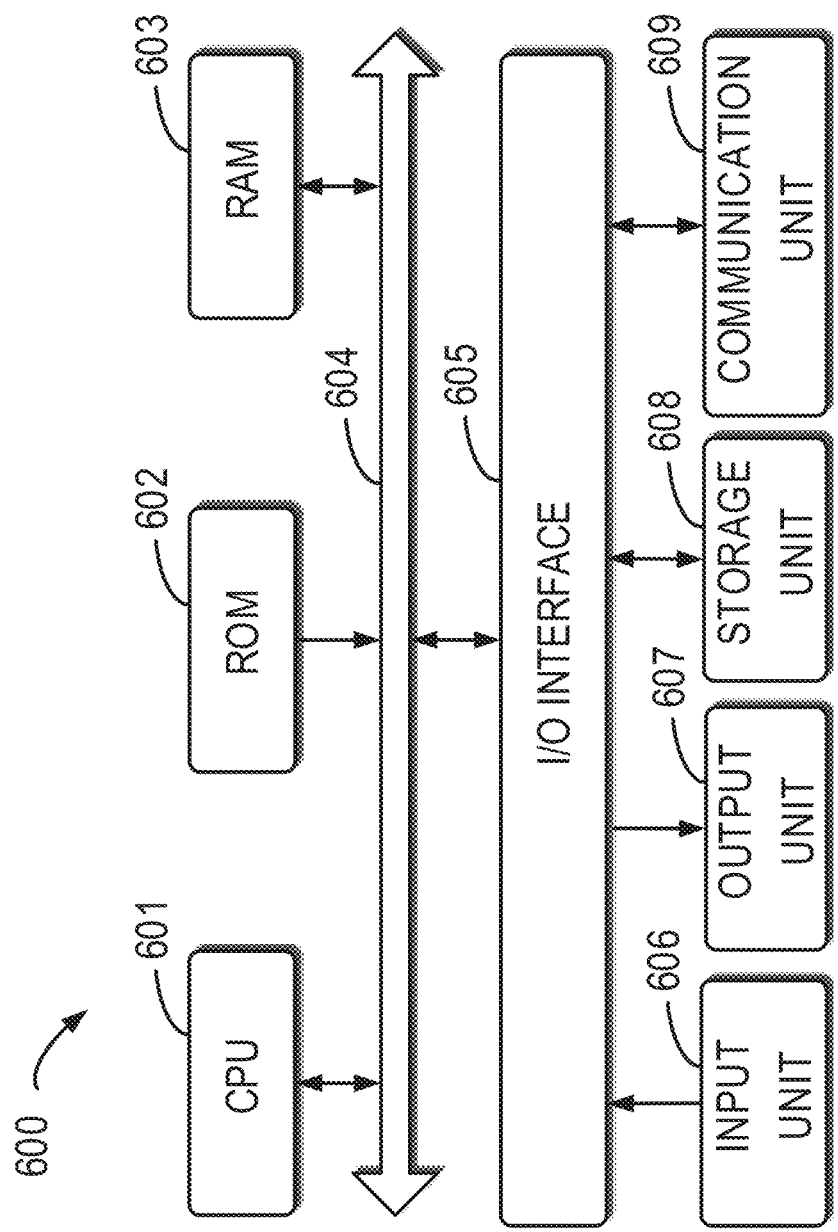
FIG. 6 graphically illustrates a schematic block diagram of an example device suitable for implementing embodiments of the present disclosure.

FIG. 6 illustrates a schematic block diagram of an example device 600 for implementing embodiments of the present disclosure. For example, any one of 102, 104 and 106 shown in FIG. 1 can be performed by the device 600. As shown, the device 600 includes a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as keyboard, mouse and the like; an output unit 607, e.g., various kinds of display and loudspeakers etc.; a storage unit 608, such as disk, optical disk etc.; and a communication unit 609, such as network card, modem, wireless transceiver and the like. The communication unit 609 allows the device 600 to exchange information/data with other devices via the computer network, such as Internet, and/or various telecommunication networks.

The above described various procedures and processing, such as methods 200 and 300, can be executed by the processing unit 601. For example, in some embodiments, methods 200 and 300 can be implemented as computer software programs tangibly included in the machine-readable medium, such as storage unit 608. In some embodiments, the computer program can be partially or fully loaded and/or mounted to the device 600 via ROM 602 and/or communication unit 609. When the computer program is loaded to RAM 603 and executed by the CPU 601, one or more actions of the above described methods 200 and 300 can be executed.

The present disclosure can be method, apparatus, system and/or computer program product. The computer program product can include a computer-readable storage medium loaded with computer-readable program instructions for executing various aspects of the present disclosure.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments disclosed herein. Many modifications and alterations, without deviating from the scope and spirit of the explained various embodiments, are contemplated. The selection of terms in the text aims to best explain principles and actual applications of each embodiment and technical improvements made to the technology in the market by each embodiment, or enable others ordinary skilled in the art to understand embodiments of the present disclosure.

What is claimed is:

1. A method of data processing, comprising:
  receiving a data packet related to a service;
  determining whether predefined configuration information indicates a priority of the service; and
  in response to the configuration information indicating the priority of the service, adding an indication of the priority into the data packet;
  wherein adding an indication of the priority into the data packet comprises:
  comparing the priority with a threshold priority;
  in response to the priority being higher than the threshold priority, determining a first predetermined field in the data packet as an insertion position in the data packet to which the indication is added; and
  in response to the priority being lower than or equaling to the threshold priority, determining a second predetermined field in the data packet as the insertion position, the second predetermined field being different from the first predetermined field.

2. The method of claim 1, wherein
the first predetermined field is a type-of-service field in an Internet Protocol (IP) header of the data packet.

3. The method of claim 1, further comprising:
in response to receiving the data packet, verifying an IP header of the received data packet to determine a validity of the received data packet.

4. The method of claim 1, further comprising:
initiating a given transmission strategy based on the indication of the priority.

5. The method of claim 1, wherein one or more of the receiving, determining and adding steps are performed by a proxy component.

6. The method of claim 5, wherein the proxy component is configured as part of an inter-service communication protocol.

7. An electronic device for data processing, comprising:
a processor; and
a memory comprising computer program instructions stored thereon, the processor executing the computer program instructions in the memory to control the electronic device to perform acts comprising:
receiving a data packet related to a service;
determining whether predefined configuration information indicates a priority of the service; and
in response to the configuration information indicating the priority of the service, adding an indication of the priority into the data packet;
wherein adding an indication of the priority into the data packet comprises:
comparing the priority with a threshold priority;
in response to the priority being higher than the threshold priority, determining a first predetermined field in the data packet as an insertion position in the data packet to which the indication is added; and
in response to the priority being lower than or equaling to the threshold priority, determining a second predetermined field in the data packet as the insertion position, the second predetermined field being different from the first predetermined field.

8. The electronic device of claim 7, wherein
the first predetermined field is a type-of-service field in an IP header of the data packet.

9. The electronic device of claim 7, wherein the acts further comprise:
in response to receiving the data packet, verifying an IP header of the received data packet to determine a validity of the received data packet.

10. The electronic device of claim 7, wherein the acts further comprise:
initiating a given transmission strategy based on the indication of the priority.

11. The electronic device of claim 7, wherein a proxy component performs one or more of the acts.

12. The electronic device of claim 11, wherein the proxy component is configured as part of an inter-service communication protocol.

13. The electronic device of claim 7, wherein the second predetermined field is another type-of-service field in the IP header of the data packet.

14. A computer program product comprising a non-transitory computer storage medium having stored therein machine-executable instructions which, when executed by a machine, cause the machine to perform acts comprising:
receiving a data packet related to a service;
determining whether predefined configuration information indicates a priority of the service; and
in response to the configuration information indicating the priority of the service, adding an indication of the priority into the data packet;
wherein adding an indication of the priority into the data packet comprises:
comparing the priority with a threshold priority;
in response to the priority being higher than the threshold priority, determining a first predetermined field in the data packet as an insertion position in the data packet to which the indication is added; and
in response to the priority being lower than or equaling to the threshold priority, determining a second predetermined field in the data packet as the insertion position, the second predetermined field being different from the first predetermined field.

15. The computer program product of claim 14, wherein the first predetermined field is a type-of-service field in an IP header of the data packet.

16. The computer program product of claim 14, wherein the acts further comprise:
in response to receiving the data packet, verifying an IP header of the received data packet to determine a validity of the received data packet.

17. The computer program product of claim 14, further comprising:
initiating a given transmission strategy based on the indication of the priority.

18. The computer program product of claim 14, wherein a proxy component performs one or more of the acts.

19. The computer program product of claim 18, wherein the proxy component is configured as part of an inter-service communication protocol.

20. The computer program product of claim 14, wherein the second predetermined field is another type-of-service field in the IP header of the data packet.

* * * * *